April 28, 1970     J. V. YOUNGKIN     3,508,366
FOUNDATION STRUCTURE FOR MOBILE HOME
Original Filed Dec. 2, 1964
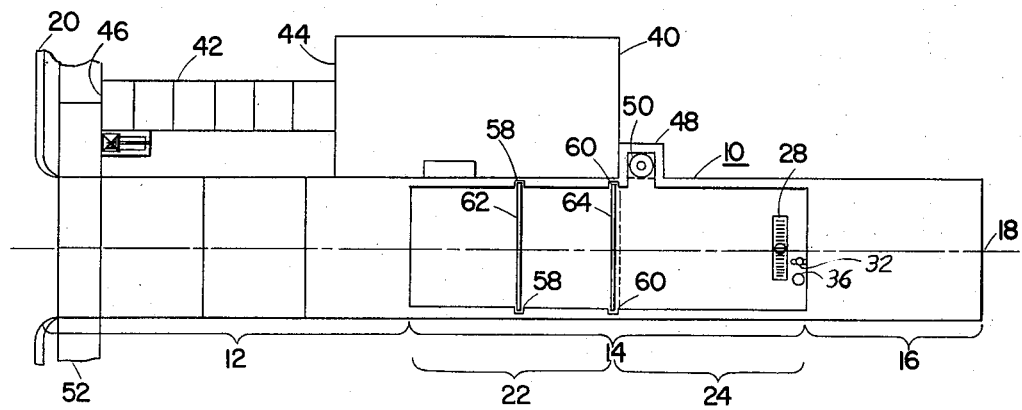
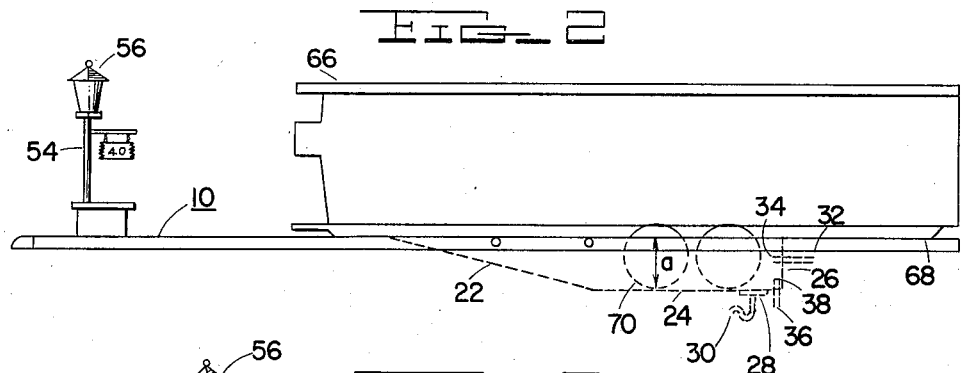
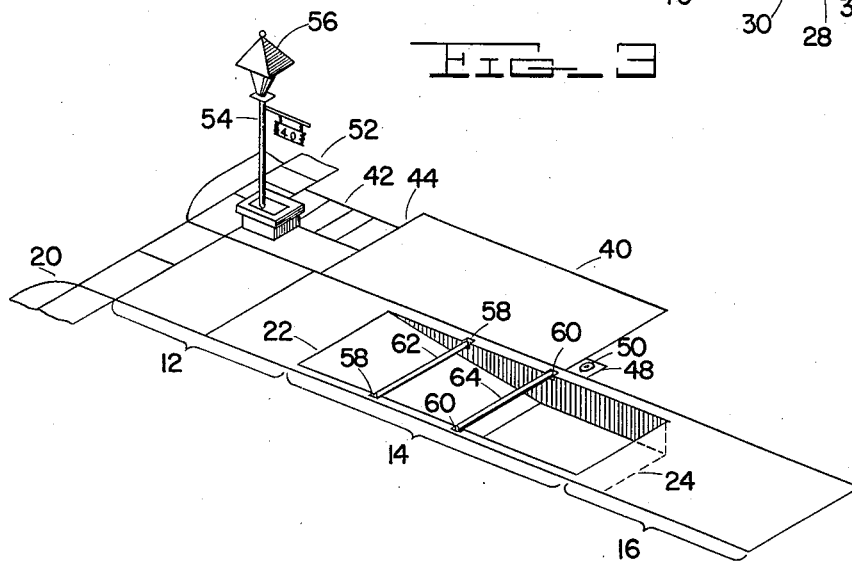
INVENTOR
JERRY V. YOUNGKIN
BY Hood, Gust + Irish
ATTORNEYS

United States Patent Office 3,508,366
Patented Apr. 28, 1970

3,508,366
FOUNDATION STRUCTURE FOR MOBILE HOME
Jerry V. Youngkin, Youngkin's Mobile Park, R.R. 6,
Columbia City, Ind. 46725
Continuation of application Ser. No. 415,399, Dec. 2,
1964. This application June 18, 1968, Ser. No. 748,146
Int. Cl. E02d 27/32; E04h 14/00
U.S. Cl. 52—169   4 Claims

ABSTRACT OF THE DISCLOSURE

A support structure for a mobile home having a path with an upwardly facing surface for engaging the frame of a mobile home and for supporting the same and a subterranean cavity portion in which the wheels of the mobile home are positioned. The path portion of the structure is preferably elongated so as to extend from a road inwardly of a lot upon which a mobile home is desirably positioned. The subterranean portion includes a ramp section down which the wheels of the mobile home can be moved to position the mobile home upon the path portion of the structure. Within the subterranean portion there may be provided a drain, suitable water lines and sewage lines having couplings such that the mobile home can be connected to the same. An access can be provided by means of a manhole. In a preferred embodiment, there is provided a patio, a walk-way, and a lantern. The frame of the mobile home is supported completely by portions of the upwardly facing path portion of the structure located adjacent opposite ends of the subterranean portion and by at least one support member which extends laterally over the ramp section of the subterranean portion. In a specific embodiment, the subterranean portion may have a depth such that either the tires of the mobile home are suspended within the subterranean portion when the mobile home is suitably positioned upon the structure or the subterranean portion may have a depth such that the mobile home will be lowered onto the structure as desired by deflating the tires of the mobile home once the mobile home is positioned thereon as desired.

CROSS REFERENCES TO RELATED APPLICATIONS

This application is a continuation of application Ser. No. 415,399, filed Dec. 2, 1964, and now abandoned, bearing the title "Support Structure."

BACKGROUND OF THE INVENTION

Field of the invention

This invention generally relates to a support structure and more specifically relates to an installation ramp and support structure for a mobile home.

DESCRIPTION OF THE PRIOR ART

It has long been desirable to provide a support structure for a mobile home whenever the mobile home is to remain stationary at one place for any length of time. The primary purpose of the support structure is to provide the mobile home with a more stable support than the wheels which may become soft and thereby slope the floor of the mobile home and which may allow the mobile home to rock in relatively high winds. Such a support structure, however, should also be attractive in appearance, provide access to the underneath of the mobile home so that utility lines and sewage lines can be connected to the mobile home and serviced when necessary, and provide means for easily removing the support whenever the mobile home is again to be transported by means of its wheels. It is therefore desirable to provide an improved mobile home support structure which is attractive, provides access to the underside of the mobile home, and which can easily be removed from the mobile home whenever it is desired to transport the mobile home.

SUMMARY OF THE INVENTION

It is therefore a primary object of this invention to provide an improved mobile home support structure which is attractive and materially adds to the appearance of a mobile home.

It is another object of this invention to provide an improved support structure for a mobile home which stabilizes the mobile home and holds the floor of a mobile home substantially horizontal.

It is yet another object of this invention to provide an improved support structure for a mobile home which can be easily removed from the mobile home whenever it is desired to transport the same.

It is a further object of this invention to provide an improved support structure for a mobile home which provides access to the underside of the mobile home so that utility lines can be relatively easily attached and serviced when needed.

It is still further an object of this invention to provide an improved mobile home support structure having the above-mentioned properties which is adapted to receive several different sizes of mobile homes and which is relatively simple in structure and inexpensive to manufacture.

In the broader aspects of this invention, there is provided a mobile home support structure comprising a path having a subterranean cavity intermediate the ends thereof which is adapted to receive a frame of a mobile home thereon and the wheels of a mobile home therein, respectively.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a top view showing the improved mobile home support structure of this invention;

FIG. 2 is a plan view of the improved mobile home support structure as shown in FIG. 1; and FIG. 3 is a perspective view of the improved support structure as shown in FIGS. 1 and 2.

DESCRIPTION OF THE PREFERRED EMBODIMENT

Referring now to the drawings, there is shown a mobile home support structure having an elongated path 10 which is divided into an access portion 12, a subterranean or cavity portion 14, and a support portion 16. Each of the portions have substantially identical widths, different lengths, and are aligned in end to end relationship along a common longitudinal axis 18, which, if extended, would intersect a road 20 in a generally perpendicular manner. The access portion 12 of the path 10 communicates with the road 20 and extends inwardly therefrom. The subterranean portion 14 is intermediate the access portion 12 and the support portion 16 and has an inclined ramp section 22 and a bottom 24. The bottom 24 is beneath the path 10 and substantially parallel therewith. The ramp section 22 communicates with and extends between the access portion 12 and the bottom 24 of the subterranean portion 14. The bottom 24 extends between the ramp section 22 and a vertical step portion 26 which extends upwardly from the bottom 24 to support portion 16. The support portion 16 extends axially away from the road 20 from step 26.

In the bottom 24 of the subterranean portion 14, there may be provided a drain 28 which communicates with a storm sewer (not shown) by means of pipe 30, a water line 32 having a coupling portion at its distal end 34 extending from step 26 and adjacent to bottom 24 and communicating with a water supply at its other end (not shown), and a sewage line 36 having a coupling portion at its distal end 38 and which extends upwardly from the bottom 24 and communicates with a sewage disposal means (not shown).

Contiguous to a periphery of both the access portion 12 and the subterranean portion 14 is a patio 40 which extends outwardly therefrom. A walkway 42 extends from an edge 44 of the patio 40 to a position 46 adjacent to the road 20 and generally parallel to the path 10. A manhole 48 having a cover 50 thereon and communicating with the subterranean portion 14 provides access to the subterranean portion so that the drain 28, the water line 32, and the sewage line 36 may be serviced whenever necessary. A sidewalk 52 extends generally parallel and adjacent to the road 20 and communicates with the walkway 42 and the path 10. Adjacent to the sidewalk 52 and between the walkway 42 and the path 10 is located a means for supporting in an obvious manner a street number and illuminating the same. In the preferred embodiment, as illustrated, the illuminating means is shown to be an attractive lantern 56 which can be illuminated by either gas, electricity, or a like manner.

In the opposite sides of the subterranean portion 14 there are located two pairs of recesses 58, 60. Each recess of a pair is opposite and in registry with the other recess of the same pair. The pair of support members 62, 64 are held laterally of the path 10 and over the ramp section 22 by positioning the respective ends thereof in the recesses 58, 60, respectively. A surface thereof of each support member is generally flush with the path 10.

Now referring to FIG. 2, there is shown a conventional mobile home 66 having a frame 68 and a pair of wheels 70 mounted thereon supported by the improved support structure of this invention. The distance A which is the distance between the frame 68 and the periphery of the wheels 70 upon which the trailer rests measured perpendicularly to the frame 68 and diametrically of the wheels 70 is substantially equal to the vertical height of the step 26 so that when the wheels 70 rest on bottom 24, the frame 68 rests on the access portion 12, the support members 62, 64 and the support portion 16 of the path 10.

In a specific embodiment, the distance A may be slightly greater than the vertical height of the step 26 so that the trailer 66 may be backed to the position shown in FIG. 2 and then gently lowered to path 10 by means of deflating the tires 70.

In operation, the mobile home can be positioned on the support structure of the invention, as shown in FIG. 2 and by first removing the support members 62, 64 from the recesses 58, 60, respectively of the support structure shown in FIGS. 1 and 3. The mobile home is then backed over the access portion 12 toward the subterranean portion 14. As soon as the wheels 70 of the mobile home are positioned on the ramp section 22, the mobile home begins to lower itself onto the path 10 of the support structure. As soon as the wheels 70 have passed the recesses 58, support member 62 is positioned therein. Likewise, as soon as the wheels have passed recesses 60, the support member 64 is positioned therein. The backing of the mobile home into the subterranean portion 14 continues until the frame of the mobile home is positioned over the path portions adjacent to the opposite ends of the subterranean portion 14 and the wheels 70 are no longer on the ramp section 22. At this stage, the mobile home will either be fully supported by the support structure of the invention or can be lowered upon the path 10 so as to be supported thereon by deflating the tires of the wheels 70. Whether or not the deflating of the tires of the wheels 70 is necessary to position the frame of the mobile home upon the support structure depends upon the depth of the subterranean portion 14 as above-mentioned.

While most mobile homes can be positioned upon the support structure of this invention by the technique above-described, it may be necessary in a given case to jack certain portions of the mobile home to raise the frame of the mobile home above the path 10 sufficiently to allow the members 62, 64 to be positioned within the recesses 58, 60, respectively, or to provide clearance between the path 10 and the mobile home.

While there have been described above the principles of this invention in connection with specific apparatus, it is to be clearly understood that this description is made only by way of example.

What is claimed is:

1. A support structure for a mobile home comprising an elongated path having an access portion, a subterranean portion, and a support portion, said portions being aligned in end-to-end relationship along a common longitudinal axis which if extended would intersect a road, said access portion communicating with the road and extending inwardly therefrom, said subterranean portion being intermediate said other two path portions and having an inclined ramp section and a bottom, said bottom being beneath said path, said ramp section communicating with and extending between said access portion and said bottom, said bottom extending axially between said access portion and said bottom, said bottom extending axially between said ramp section and a position displaced beneath said support portion, said support portion extending axially away from said subterranean portion, means for draining rain water from said subterranean portion, and at least one pair of recesses in said subterranean portion, said recesses of said pair being opposite and in registry with each other, at least one support member extending laterally of said subterranean portion with the opposite ends thereof positioned in said pair of recesses, respectively, one surface of said support member being generally flush with said path.

2. The combination of claim 1 further comprising a mobile home having a frame and wheels mounted thereon, the distance between said frame and the periphery of said wheels upon which said mobile home rests measured diametrically of said wheels and perpendicularly of said frame being generally equal to the greatest depth of said subterranean portion, said mobile home being mounted on said path and support member with the ends of said frame resting on said access and support portions, respectively, said wheels being in said subterranean portion.

3. The combination of claim 2 wherein said distance between said frame and the periphery of said wheels is larger than the maximum depth of said subterranean portion.

4. A support structure for a mobile home comprising an elongated path having an access portion, a subterranean portion, and a support portion, said portions being aligned in end-to-end relationship along a common longitudinal axis which if extended would intersect a road, said access portion communicating with the road and extending inwardly therefrom, said subterranean portion being intermediate said other two path portions and having a bottom, said bottom being beneath said path, said bottom being inclined adjacent to one end of said subterranean portion thereby defining an inclined ramp portion and a remaining bottom portion, said ramp portion communicating with and extending between said access portion and said remaining bottom portion, at least one support member extending over said ramp portion, means on opposite sides of said subterranean portion for removably supporting said member in position, said ramp portion having a predetermined incline and said member being spaced from said one end a distance whereby said member can be removed from said support means and a mobile home can be backed down said ramp and said member can be positioned on and supported by said means before said mobile home engages said path thereby mounting a mobile home on said path and said member, said support portion extending axially away from said subterranean portion, and means for draining rain water from said subterranean portion.

References Cited

UNITED STATES PATENTS

| | | | |
|---|---|---|---|
| Re. 16,964 | 5/1928 | Nicholson | 52—174 |
| 1,272,500 | 7/1918 | Moser | 254—45 |
| 1,785,167 | 12/1930 | Young | 254—45 |
| 2,212,757 | 8/1940 | Stout | 52—20 X |
| 3,007,212 | 11/1961 | Gazin | 52—169 X |
| 3,016,583 | 1/1962 | Grunt et al. | 52—143 |
| 3,172,377 | 3/1965 | Dewar | 52—169 X |

FRANK L. ABBOTT, Primary Examiner

P. C. FAW, Jr., Assistant Examiner

U.S. Cl. X.R.

52—143, 174